(12) United States Patent
Shao et al.

(10) Patent No.: US 11,949,308 B2
(45) Date of Patent: Apr. 2, 2024

(54) VIBRATION MOTOR WITH ELASTIC SUPPORT HAVING ACUTE BENDING ANGLE AND OBTUSE ANGLE

(71) Applicant: AAC Microtech (Changzhou) Co., Ltd., Changzhou (CN)

(72) Inventors: Yan Shao, Shenzhen (CN); Xiaorong Zhou, Shenzhen (CN); Fanghua Ling, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 219 days.

(21) Appl. No.: 17/555,534

(22) Filed: Dec. 20, 2021

(65) Prior Publication Data
US 2022/0200428 A1 Jun. 23, 2022

(30) Foreign Application Priority Data
Dec. 22, 2020 (CN) .......................... 202023122432.X

(51) Int. Cl.
*H02K 33/02* (2006.01)
(52) U.S. Cl.
CPC .................................. *H02K 33/02* (2013.01)
(58) Field of Classification Search
CPC ........ H02K 35/00; H02K 35/02; H02K 35/04; H02K 35/06; H02K 35/08; H02K 33/00; H02K 33/02; H02K 33/04; H02K 7/1869; H02K 7/1876; H02K 7/1892; H02K 33/16
USPC .... 310/25, 15, 28–30, 36–37, 12.01, 81, 80, 310/321, 20, 21, 40 MM
See application file for complete search history.

(56) References Cited

U.S. PATENT DOCUMENTS

| 5,682,132 | A * | 10/1997 | Hiroyoshi | G08B 6/00 340/407.1 |
| 7,339,857 | B2 * | 3/2008 | Matthey | B06B 1/045 368/230 |
| 8,288,898 | B2 * | 10/2012 | Jun | H02K 33/16 310/34 |
| 8,643,229 | B2 * | 2/2014 | Park | H02K 33/16 310/15 |
| 8,878,401 | B2 * | 11/2014 | Lee | H02K 33/16 310/15 |

(Continued)

FOREIGN PATENT DOCUMENTS

CN 206402080 U * 8/2017

OTHER PUBLICATIONS

CN206402080U English Translation.*

*Primary Examiner* — Maged M Almawri
(74) *Attorney, Agent, or Firm* — W&G Law Group

(57) ABSTRACT

The present disclosure provides a vibration motor, including a housing with an accommodation space; a vibration part and a stator contained in the accommodation space; an elastic support suspending and supporting the vibration part in the accommodation space for providing elastic restoring force to the vibration part. The elastic support includes a first fixed part fixed on the vibration part, an elastic arm with one end thereof connected to the first fixed part, and a second fixed part formed by bending another end of the elastic arm and fixed on the housing. An extension direction of the first fixed part is perpendicular to a vibration direction of the vibration part, and an extension direction of the second fixed part is parallel to the vibration direction. Thus, the service life of the elastic support is improved.

8 Claims, 3 Drawing Sheets

(56) References Cited

U.S. PATENT DOCUMENTS

| | | | |
|---|---|---|---|
| 9,225,265 B2* | 12/2015 | Oh | G06F 3/016 |
| 9,748,827 B2* | 8/2017 | Dong | H02K 33/16 |
| 9,912,217 B2* | 3/2018 | Xu | H02K 33/16 |
| 10,076,771 B2* | 9/2018 | Xu | H02K 33/12 |
| 10,116,194 B2* | 10/2018 | Mao | H02K 11/215 |
| 10,596,594 B2* | 3/2020 | Ling | H02K 33/02 |
| 11,641,151 B2* | 5/2023 | Ma | H02K 33/16 310/29 |
| 2009/0096299 A1* | 4/2009 | Ota | B06B 1/045 310/25 |
| 2009/0267423 A1* | 10/2009 | Kajiwara | H02K 33/02 310/38 |
| 2010/0213773 A1* | 8/2010 | Dong | H02K 33/16 310/25 |
| 2011/0101797 A1* | 5/2011 | Lee | H02K 33/16 310/29 |
| 2011/0115311 A1* | 5/2011 | Dong | H02K 33/16 310/28 |
| 2011/0156500 A1* | 6/2011 | Dong | H02K 33/16 310/25 |
| 2012/0104875 A1* | 5/2012 | Park | H02K 33/16 310/25 |
| 2012/0169151 A1* | 7/2012 | Dong | H02K 33/16 310/25 |
| 2014/0152148 A1* | 6/2014 | Oh | B06B 3/00 310/321 |
| 2015/0207392 A1* | 7/2015 | Iwakura | H02K 33/00 310/25 |
| 2015/0328664 A1* | 11/2015 | Kim | B06B 1/0644 310/323.01 |
| 2016/0013710 A1* | 1/2016 | Dong | H02K 33/16 310/25 |
| 2016/0218607 A1* | 7/2016 | Oh | H02K 33/16 |
| 2016/0226365 A1* | 8/2016 | Wang | H02K 33/16 |
| 2017/0033651 A1* | 2/2017 | Mao | H02K 33/16 |
| 2017/0104401 A1* | 4/2017 | Umehara | H02K 33/06 |
| 2017/0373574 A1* | 12/2017 | Chai | H02K 33/00 |
| 2017/0373577 A1* | 12/2017 | Huang | H02K 33/16 |
| 2018/0297071 A1* | 10/2018 | Xu | B06B 1/045 |
| 2018/0297074 A1* | 10/2018 | Huang | B06B 1/045 |
| 2018/0297076 A1* | 10/2018 | Xu | B06B 1/045 |
| 2019/0036435 A1* | 1/2019 | Zhu | H02K 33/02 |
| 2019/0305637 A1* | 10/2019 | Suzuki | B06B 1/045 |
| 2019/0314860 A1* | 10/2019 | Katada | B06B 1/045 |
| 2020/0044526 A1* | 2/2020 | Tang | H02K 33/18 |
| 2020/0044534 A1* | 2/2020 | Tang | H02K 33/18 |
| 2020/0044548 A1* | 2/2020 | Tang | H02K 33/18 |
| 2020/0212774 A1* | 7/2020 | Ling | H02K 1/34 |
| 2022/0200427 A1* | 6/2022 | Ma | H02K 33/02 |
| 2022/0200433 A1* | 6/2022 | Mao | H02K 33/18 |

* cited by examiner

VIBRATION MOTOR WITH ELASTIC SUPPORT HAVING ACUTE BENDING ANGLE AND OBTUSE ANGLE

FIELD OF THE PRESENT DISCLOSURE

The present disclosure relates to motors, in particular to a vibration motor for providing tactile feedback.

DESCRIPTION OF RELATED ART

The vibration motor generally comprises a vibration part and an elastic support contained in a housing. The elastic support is used for suspending the vibration part in the housing. The elastic support of the existing vibration motor is roughly a straight plate structure. Two elastic supports are respectively located above and below the vibration part, and one end is fixed on the vibration part, and the other end is fixed on the second housing or top wall of the housing. As a result, the length of the arm of the spring support is too short, and the stress is too large during the vibration process, resulting in easy fatigue fracture. In addition, the assembly process is complicated and difficult. It is necessary to weld the other ends of the two elastic supports to the second housing and the top wall respectively. This process is complicated and it is difficult to ensure the welding strength.

SUMMARY OF THE PRESENT DISCLOSURE

One of the objects of the present disclosure is to provide a vibration motor improving the service life of the elastic support, and effectively improving assembly efficiency and product utilization.

To achieve the above-mentioned object, the present disclosure provides A vibration motor, comprising: a housing with an accommodation space; a vibration part and a stator contained in the accommodation space; an elastic support suspending and supporting the vibration part in the accommodation space for providing elastic restoring force to the vibration part; the elastic support comprising a first fixed part fixed on the vibration part, an elastic arm with an end thereof connected to the first fixed part, and a second fixed part formed by bending from the other end of the elastic arm and fixed on the housing; wherein an extension direction of the first fixed part is perpendicular to a vibration direction of the vibration part, and an extension direction of the second fixed part is parallel to the vibration direction.

In addition, the vibration motor comprises two elastic supports arranged symmetrically with respect to a center of the vibration part.

In addition, a bending angle between the elastic arm and the second fixed part is an acute angle, the elastic arm and the first fixed part forms an obtuse angle.

In addition, the elastic support is a sheet metal body and includes a through groove penetrating the elastic support; one opening of the through groove is disposed in the first fixed part, and another opening of the through groove is disposed in the second fixed part.

In addition, an outer side of the first fixed part is welded and fixed with the first fixed piece, and the first fixed piece at least partially covers one opening of the through groove; an outer side of the second fixed part is welded and fixed with the second fixed piece, and the second fixed piece at least partially covers the other opening of the through groove.

In addition, the housing comprises a first housing having an opening and a second housing that closes the opening of the first housing; the first housing and the second housing jointly form the accommodation space; the vibration part is fixed to the first housing by the elastic support; the stator is fixed to the second housing.

In addition, the first housing comprises a top wall opposite to the second housing and spaced apart from each other, and a side wall bent from the top wall to the second housing; the sidewall comprises a first sidewall located at opposite ends of the vibration part in a length direction and a second sidewall located at the opposite ends of a width direction of the vibration part.

In addition, the first fixed part is welded and fixed to one end of the vibration part, and the second fixing part is welded and fixed to the first side wall of the housing away from the one end of the vibration part.

In addition, the vibration part comprises a weight provided with an accommodation cavity and a magnet accommodated in the accommodation cavity; the stator comprises a circuit board arranged on the second housing and a coil installed on the circuit board and electrically connected to the circuit board; the coil at least partially extends into the accommodation cavity and is spaced from and opposite to the magnet.

In addition, the vibration motor comprises two magnets respectively located on two sides of the coil, and polarities of the two magnets are opposite.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figures and the embodiment. It should be understood the specific embodiment described hereby is only to explain the disclosure, not intended to limit the disclosure.

In the disclosure, the terms "first" and "second" are only used for descriptive purposes, and cannot be understood as indicating or implying relative importance or implicitly indicating the number of indicated technical features. Thus, the features defined with "first" and "second" may explicitly or implicitly comprise one or more of these features.

Figure 1:
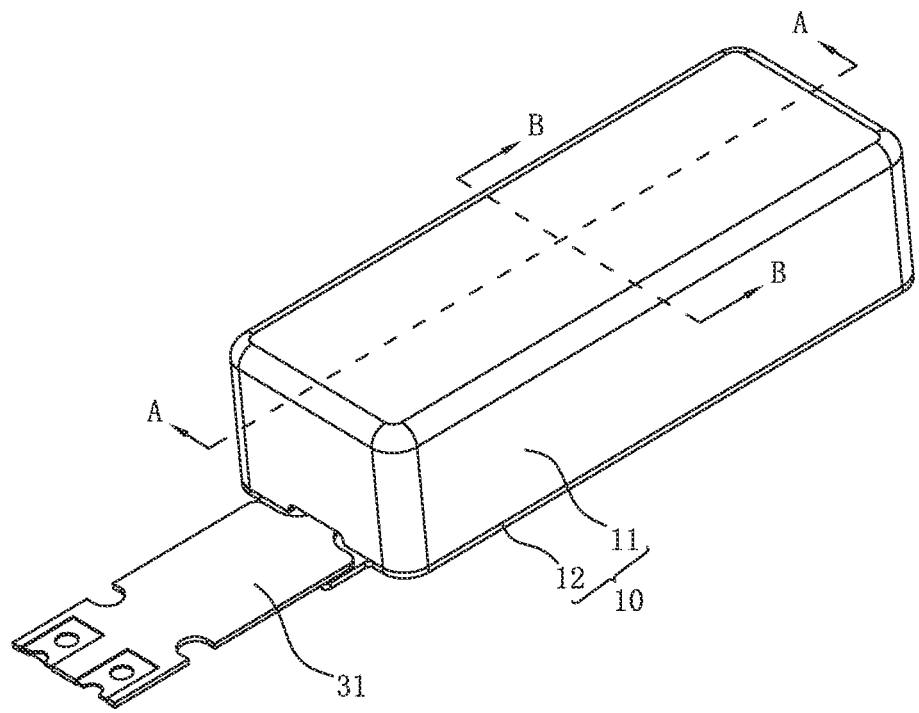
FIG. 1 is an isometric view of a vibration motor in accordance with an exemplary embodiment of the present disclosure.
Figure 2:
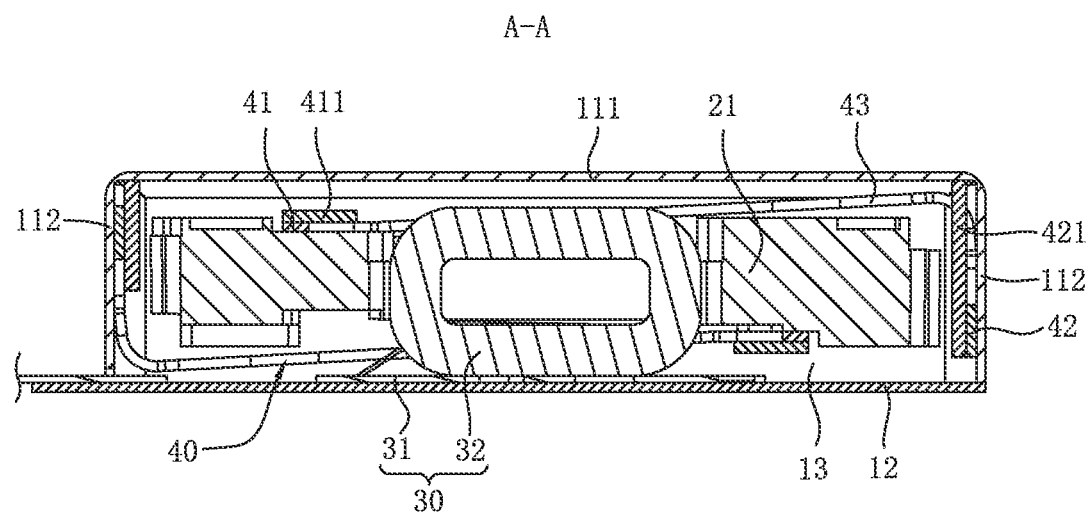
FIG. 2 is a cross-sectional view of the vibration motor in FIG. 1, taken along line A-A.
Figure 3:
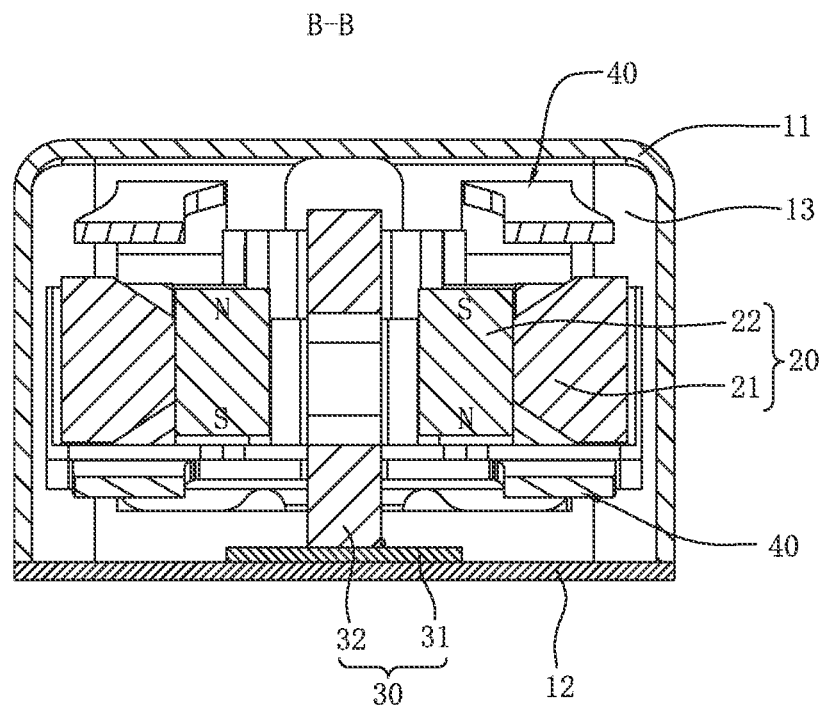
FIG. 3 is a cross-sectional view of the vibration motor taken along line B-B in FIG. 1.

Referring to FIGS. 1-3, a vibration motor in accordance with an exemplary embodiment of the present disclosure comprises a housing 10 with an accommodation space 13, a vibration part 20 and a stator 30 contained in the accommodation space 13, and an elastic support 40 that suspends and supports the vibration part 20 in the accommodation space 13 and provides elastic restoring force for the vibration part 20.

Figure 4:
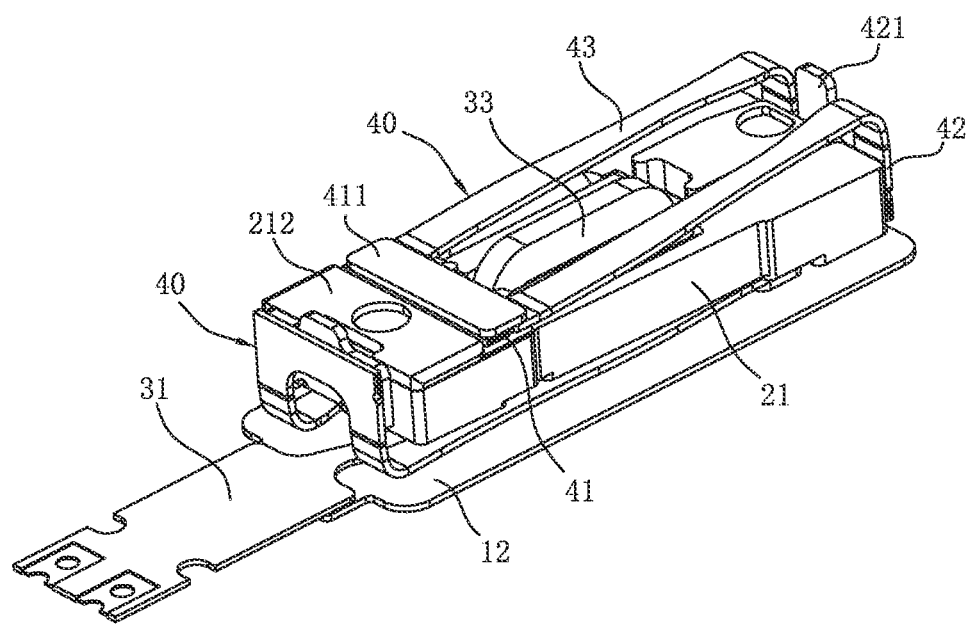
FIG. 4 is an isometric view of the vibration motor in FIG. 1, with a housing thereof removed.
Figure 5:
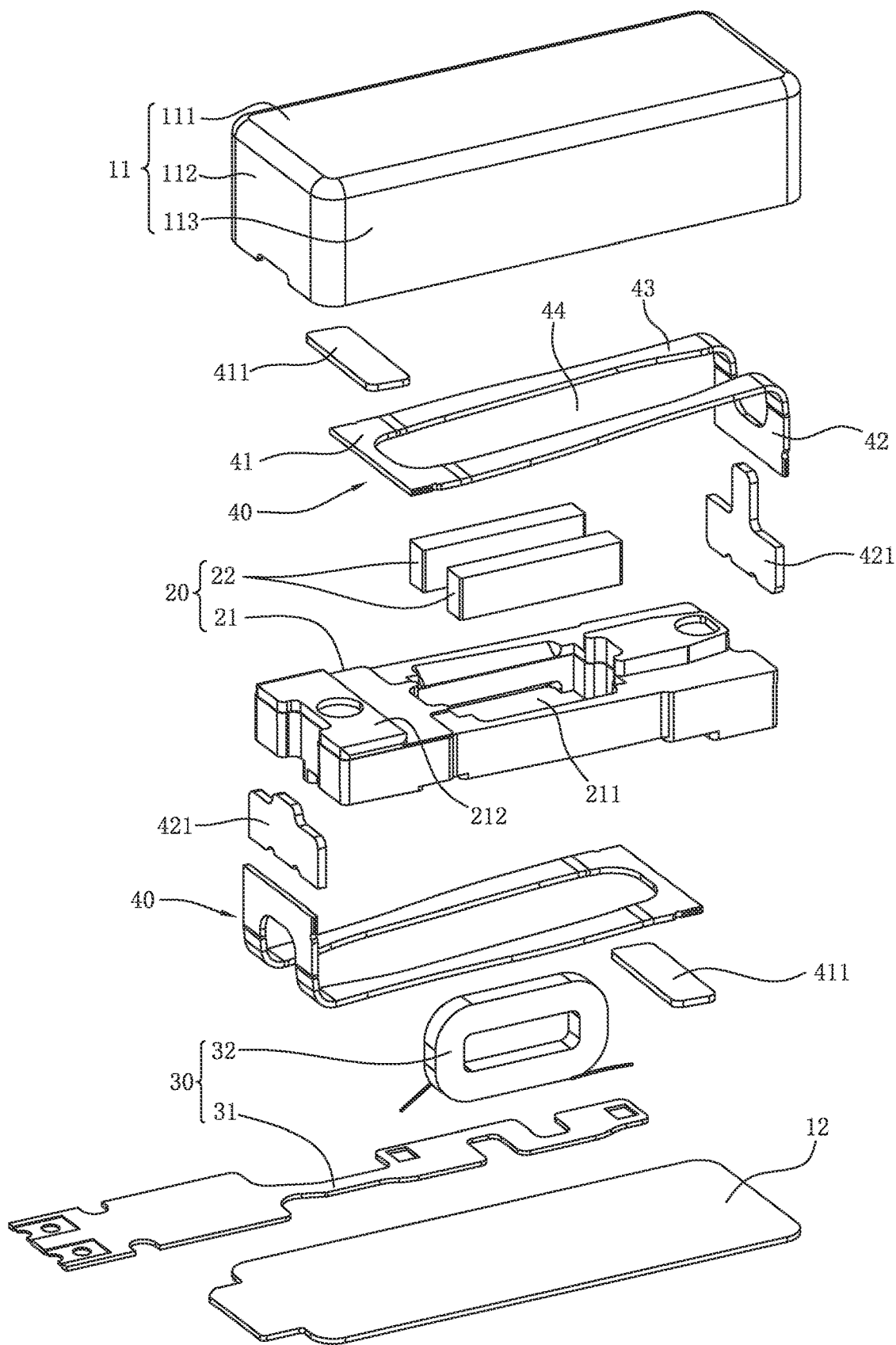
FIG. 5 is an exploded view of the vibration motor in FIG. 1.

Furthermore, as shown in FIGS. 4-5, the housing 10 is roughly a cuboid structure, and comprises a first housing 10 having an opening and a second housing 12 closing the opening of the first housing 11. The first housing 11 and the second housing 12 together form an accommodation space 13. And the vibration part 20 is fixed with the first housing 11 through the elastic support 40. The stator 30 is fixed to the second housing 12. Specifically, the second housing 12 is a flat structure, and the first housing 11 comprises a top wall 111 opposite to the second housing 12 and spaced apart from each other, and a side wall bent from the top wall 111 to the second housing 12. The side walls comprise a first sidewall 112 located at opposite ends of the vibration part 20 in the length direction and a second sidewall 113 located at the opposite ends of the vibration part 20 in the width direction.

The vibration part 20 comprises a weight 21 provided with an accommodation cavity 211 and a magnet 22 accommodated and fixed on the side wall of the accommodation cavity 211. The stator 30 comprises a circuit board 31 mounted on the second housing 12 and a coil 32 mounted on the circuit board 31 and electrically connected to the circuit board 31. The coil 32 extends at least partially into the accommodation cavity 211 and is spaced apart from and opposite to the magnet 22. The weight 21 is fixed with the first housing 11 through the elastic support 40 as the main weight of vibration part 20. The magnet 22 is used in conjunction with coil 32 for generating electromagnetic force for driving the longitudinal linear vibration of vibration part 20. The elastic support 40 is used for providing elastic restoring force, that is, for providing the vibration part 20 with linear guiding and the force of restoring to the equilibrium position. The circuit board 31 is used to enable the coil 32 to be electrically connected with external devices, so as to provide electric energy for the coil 32.

In this embodiment, the accommodation cavity 211 is a through-hole that penetrates the weight 21. The number of magnet 22 is two, which are located on both sides of the coil 32 and fixed on both sidewalls of the accommodation cavity 211 in a width direction of the vibration part 20, and polarities of the two magnets 22 are opposite, that is, the two magnets 22 are arranged symmetrically with respect to the center of the coil 32, which increases the driving force of the coil 32 against the vibration part 20 and improves the vibration feeling of the vibration motor. When the second housing 12 is covered and fixed at the opening of the first housing 11, the coil 32 of the stator 30 just extends into the accommodation cavity 211 of the weight 21. This eliminates the need for tooling positioning and optimizes the production and assembly process, saves labor cost and reduces production cost.

In a specific embodiment of the present disclosure, two elastic supports 40 are provided, which are respectively arranged above and below the vibration part 20, and are arranged symmetrically with respect to the center of the vibration part 20. The vibration part 20 is suspended between two elastic supports 40 and reciprocates under the action of the elastic restoring force provided by the elastic supports 40 to realize the vibration of the vibration motor.

Wherein, the elastic support 40 comprises a first fixed part 41 fixed on the vibration part 20, an elastic arm 43 connected to the first fixed part 41 at one end, and a second fixed part 42 formed by bending the other end of the elastic arm 43 and fixed on the housing 10. The extension direction of the first fixed part 41 is perpendicular to the vibration direction of the vibration part 20, and the extension direction of the second fixed part 42 is parallel to the vibration direction. It should be noted that the second fixed part 42 is bent from the elastic arm 43 toward the vibration part 20 to form the elastic support 40 in a roughly L-shaped structure, and the bending position has an excessive arc. The fixation of the second fixed part 42 and the housing 10 limits the relative position of elastic support 40 and the housing 10. The fixation of the first fixed part 41 and the vibration part 20 realizes the suspension setting of the vibration part 20 in the accommodation space 13, so that the accommodation space 13 inside the housing 10 is effectively used through the bending structure of the elastic support 40 during the up and down vibration of the vibration part 20. The length of the strain area of the elastic support 40 increases and effectively improves the elastic stress of the elastic support 40 and increases the service life of the elastic support 40.

Preferably, the first fixed part 41 is fixed to one end of the weight 21 in the vibration part 20 along the length direction, and the second fixed part 42 is fixed to the first sidewall 112 of the housing 10 away from the end. That is to say, the two elastic supports 40 are respectively connected to the upper and lower sides of weight 21 through their respective the first fixed part 41, that is, the two the first fixed parts 41 are respectively connected to the two opposite corners of weight 21. The two elastic supports 40 are respectively connected to the two the first sidewalls 112 on the opposite sides of the housing 10 through the second fixed part 42 respectively, so that the two elastic supports 40 are center-symmetric with respect to the vibration part 20 to prevent the vibration part 20 from being polarized. It can be understood that the connection between the first fixed part 41 and the weight 21 and the connection between the second fixed part 42 and the first sidewall 112 can be connected by welding, bonding, or the like. In this embodiment, welding and fixing are adopted.

In order to realize the welding positioning of the weight 21 and the elastic support 40, the upper and lower surfaces of the weight 21 are respectively protrudingly formed with limiting bumps 212, and the two limiting bumps 212 are respectively located at the two ends of the weight 21. When the first fixed part 41 is welded and fixed to the weight 21, the elastic support 40 and the weight 21 are positioned by pressing against the limiting bump 212, so that the assembly is more convenient and faster.

Further, in order to avoid collision between the elastic support 40 and the vibration part 20, the bending angle between the elastic arm 43 and the second fixed part 42 is an acute angle, and the bending angle between the elastic arm 43 and the first fixed part 41 forms an obtuse angle. The bending angle can be set according to the vibration amplitude of the vibration part 20 and the structure of the weight 21. And according to the different structure of the actual weight 21, the elastic arm 43 can also be designed to bend to avoid it, which increases the strain length of the elastic support 40 and increases the elastic restoring force.

In a specific embodiment of the present disclosure, the elastic support 40 is a sheet metal body, and is provided with a through groove 44 penetrating the elastic support 40. One end of the through groove 44 extends to the first fixed part 41 and the other end extends to the second fixed part 42. On the one hand, it can increase the elastic force of the elastic support 40, reduce the resonance frequency of the vibration motor, and improve the vibration feeling of the product. On the other hand, the through groove 44 can also be used to avoid the vibration part 20 so as to reduce the size of the vibration motor.

In a specific embodiment of the present disclosure, in order to increase the service life of the elastic support 40, improve the strength of the bending structure between the first fixed part 41 with the second fixed part 42 and the elastic arm 43 is increased. The outer side of the first fixed part 41 is welded and fixed with a first fixed piece 411, and the first fixed piece 411 at least partially covers one end of the through groove 44; the outer side of the second fixed part 42 is welded and fixed with a second fixed piece 421, and the second fixed piece 421 at least partially covers on the other end of the through groove 44. Specifically, the area of the first fixed piece 411 is greater than the welding area between the first fixed part 41 and the vibration part 20; the area of the second fixed piece 421 is greater than the welding area between the second fixed part 42 and the housing 10. The first fixed part 41 is clamped and fixed between the first fixed piece 411 and the weight 21, and the second fixed part 42 is clamped and fixed between the second fixed piece 421 and the first sidewall 112 of the housing 10. In this way, it ensures the firm fixation of the elastic support 40 and the vibration part 20 and the housing 10, and protects the elastic support 40 that during frequent reciprocating vibrations, the position of the direct force is staggered from the welding position, which improves the fatigue life of the elastic support 40.

In summary, the vibration motor of the embodiment of the present disclosure is arranged by the bending structure of the elastic arm 43 of the elastic support 40 and the second fixed part 42. The accommodation space 13 inside housing 10 is effectively used, and the strain area length of elastic support 40 is increased. It effectively improves the elastic stress of the elastic support 40 and increases the service life of the elastic support 40. When assembling, the vibration part 20 and the elastic support 40 are welded and fixed, and then the elastic support 40 is welded and fixed in the first housing 11. Finally, the second housing 12 with the stator 30 is welded and fixed to the first housing 11. The semi-finished product test of the second housing 12 of the vibration motor before welding can be realized, which effectively improves the assembly efficiency and product utilization.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the disclosure to the full extent indicated by the broad general meaning of the terms where the appended claims are expressed.

What is claimed is:

1. A vibration motor, comprising:
   a housing with an accommodation space;
   a vibration part and a stator contained in the accommodation space;
   an elastic support suspending and supporting the vibration part in the accommodation space for providing elastic restoring force to the vibration part;
   the elastic support comprising a first fixed part fixed on the vibration part, an elastic arm with an end thereof connected to the first fixed part, and a second fixed part formed by bending from the other end of the elastic arm and fixed on the housing; wherein
   an extension direction of the first fixed part is perpendicular to a vibration direction of the vibration part, and an extension direction of the second fixed part is parallel to the vibration direction, the elastic support is a sheet metal body and includes a through groove penetrating the elastic support; one opening of the through groove is disposed in the first fixed part, and another opening of the through groove is disposed in the second fixed part, an outer side of the first fixed part is welded and fixed with the first fixed piece, and the first fixed piece at least partially covers one opening of the through groove, an area of the first fixed piece is greater than a welding area between the first fixed part and the vibration part; an outer side of the second fixed part is welded and fixed with the second fixed piece, and the second fixed piece at least partially covers the other opening of the through groove, an area of the second fixed piece is greater than a welding area between the second fixed part and the housing.

2. The vibration motor as described in claim 1, comprising two elastic supports arranged symmetrically with respect to a center of the vibration part.

3. The vibration motor as described in claim 1, wherein a bending angle between the elastic arm and the second fixed part is an acute angle, the elastic arm and the first fixed part forms an obtuse angle.

4. The vibration motor as described in claim 1, wherein the housing comprises a first housing having an opening and a second housing that closes the opening of the first housing; the first housing and the second housing jointly form the accommodation space; the vibration part is fixed to the first housing by the elastic support; the stator is fixed to the second housing.

5. The vibration motor as described in claim 4, wherein the first housing comprises a top wall opposite to the second housing and spaced apart from each other, and a side wall bent from the top wall to the second housing; the sidewall comprises a first sidewall located at opposite ends of the vibration part in a length direction and a second sidewall located at the opposite ends of a width direction of the vibration part.

6. The vibration motor as described in claim 5, wherein the first fixed part is welded and fixed to one end of the vibration part, and the second fixing part is welded and fixed to the first side wall of the housing away from the one end of the vibration part.

7. The vibration motor as described in claim 4, wherein the vibration part comprises a weight provided with an accommodation cavity and a magnet accommodated in the accommodation cavity; the stator comprises a circuit board arranged on the second housing and a coil installed on the circuit board and electrically connected to the circuit board; the coil at least partially extends into the accommodation cavity and is spaced from and opposite to the magnet.

8. The vibration motor as described in claim 7 comprising two magnets respectively located on two sides of the coil, and polarities of the two magnets are opposite.

* * * * *